United States Patent
Li et al.

(10) Patent No.: US 10,146,505 B2
(45) Date of Patent: Dec. 4, 2018

(54) FAST DIVIDER AND FAST DIVISION METHOD THEREOF

(71) Applicant: REALTEK SEMICONDUCTOR CORP., Hsinchu (TW)

(72) Inventors: Tsung-Hsuan Li, Taichung (TW); Hao-Tien Chiang, Taipei (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 3 days.

(21) Appl. No.: 15/442,879

(22) Filed: Feb. 27, 2017

(65) Prior Publication Data

US 2017/0255449 A1 Sep. 7, 2017

(30) Foreign Application Priority Data

Mar. 2, 2016 (TW) .............................. 105106296 A

(51) Int. Cl.
*G06F 7/535* (2006.01)
*G06F 17/16* (2006.01)

(52) U.S. Cl.
CPC .............. *G06F 7/535* (2013.01); *G06F 17/16* (2013.01); *G06F 2207/5355* (2013.01)

(58) Field of Classification Search
CPC ................................. G06F 7/535; G06F 17/16
USPC .................................................. 708/650–656
See application file for complete search history.

(56) References Cited

U.S. PATENT DOCUMENTS

| | | | | |
|---|---|---|---|---|
| 3,828,175 A | * | 8/1974 | Amdahl | G06F 7/535 708/654 |
| 4,364,115 A | * | 12/1982 | Asai | G06F 7/49 708/654 |
| 4,481,600 A | * | 11/1984 | Asai | G06F 7/535 708/654 |

OTHER PUBLICATIONS

Michael J. Flynn, "On Division by Functional Iteration", IEEE Transactions on Computers, vol. C-19, No. 8, Aug. 1970.

(Continued)

*Primary Examiner* — Tan V Mai
(74) *Attorney, Agent, or Firm* — Li & Cai Intellectual Property (USA) Office

(57) ABSTRACT

Provided is a fast divider including an initial parameter setting unit and an arithmetic unit. The arithmetic unit is coupled to the initial parameter setting unit that receives a divisor and a dividend, and sets a plurality of initial parameters of a sequence according to the divisor and the dividend. The plurality of initial parameters includes an initial term, a first term and a common ratio having an absolute value smaller than 1. The arithmetic unit stores a recurrence relation of the sequence and iteratively computes a quotient using the recurrence relation according to the plurality of initial parameters. The recurrence relation indicates that a $(k+1)^{th}$ term is equal to a product of a $k^{th}$ term multiplied by a sum of the common ratio and 1 subtracted by a product of a $(k-1)^{th}$ term multiplied by the common ratio. k is an integer larger than or equal to 1.

10 Claims, 2 Drawing Sheets

(56) References Cited

OTHER PUBLICATIONS

David L. Harris, et al., "SRT Division Architectures and Implementations", Computer Systems Laboratory, Stanford University.
S.F. Anderson, et al., "The IBM System/3GO Model 91: Floating-Point Execution Unit", IBM Journal—Jan. 1967.

* cited by examiner

FAST DIVIDER AND FAST DIVISION METHOD THEREOF

BACKGROUND

1. Technical Field

The present disclosure generally relates to a fast divider and, more particularly, to a fast divider with a high convergence speed and a fast division method thereof.

2. Description of Related Art

Division is a general method of numerical computation to obtain a quotient according to a divisor and a dividend. Therefore, a divider is an essential device in various circuits. Conventional division algorithms can be categorized into slow division, Newton-Raphson division and Goldschmidt division.

All of the three division algorithms can be used to obtain a quotient. However, these division algorithms have some problems. For example, the convergence speeds of these division algorithms are not fast enough, with the result that multiple division calculations are required to make the outcome approximate to the actual quotient. Moreover, these division algorithms take higher hardware cost, larger hardware size and higher hardware complexity to implement.

SUMMARY

One aspect of the present disclosure provides a fast divider. The fast divider includes an initial parameter setting unit and an arithmetic unit. The arithmetic unit is coupled to the initial parameter setting unit. The initial parameter setting unit is configured to receive a divisor and a dividend and set a plurality of initial parameters of a sequence according to the divisor and the dividend. The plurality of initial parameters includes an initial term, a first term and a common ratio. The common ratio has an absolute value smaller than 1 The arithmetic unit is configured to store a recurrence relation of the sequence and iteratively compute a quotient using the recurrence relation according to the plurality of initial parameters. The recurrence relation indicates that a $(k+1)^{th}$ term is equal to a product of a $k^{th}$ term multiplied by a sum of the common ratio and 1 subtracted by a product of a $(k-1)^{th}$ term multiplied by the common ratio. k is an integer larger than or equal to 1.

Another aspect of the present disclosure provides a fast division method. The fast division method includes the steps herein. In Step A, a divisor and a dividend are received. In Step B, a plurality of initial parameters of a sequence are estimated according to the divisor and the dividend. The plurality of initial parameters includes an initial term, a first term and a common ratio. The common ratio has an absolute value smaller than 1 In Step C, a quotient is iteratively computed using a recurrence relation of the sequence according to the plurality of initial parameters. The recurrence relation indicates that a $(k+1)^{th}$ term is equal to a product of a $k^{th}$ term multiplied by a sum of the common ratio and 1 subtracted by a product of a $(k-1)^{th}$ term multiplied by the common ratio. k is an integer larger than or equal to 1.

As previously stated, the present disclosure provides a fast divider and a fast division method thereof using only addition, subtraction, multiplication, and bit shifting to compute the quotient in division computation to reduce the hardware cost, the hardware size and the hardware complexity. Moreover, the present disclosure providing a fast divider and a fast division method thereof exhibits a convergence speed and the fast divider only executes a small number of iteration computations to obtain an iteration result approximate to the actual quotient.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
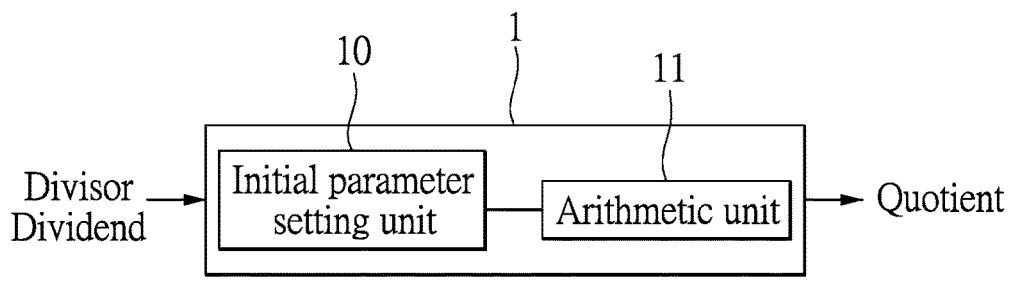
FIG. 1 is a schematic diagram of a fast divider according to one embodiment of the present disclosure.

Referring to FIG. 1, FIG. 1 is a schematic diagram of a fast divider according to one embodiment of the present disclosure. The fast divider 1 includes an initial parameter setting unit 10 and an arithmetic unit 11. The arithmetic unit 11 is coupled to the initial parameter setting unit 10.

The initial parameter setting unit 10 is configured to receive a divisor D and a dividend N and set a plurality of initial parameters of a sequence according to the divisor D and the dividend N. The sequence includes a plurality of terms. The plurality of initial parameters includes an initial term $a_0$, a first term $a_1$ and a common ratio r of the sequence. The common ratio r has an absolute value smaller than 1 (i.e., $|r|<1$).

The arithmetic unit 11 is configured to store a recurrence relation of the sequence and iteratively compute a quotient Q using the recurrence relation according to the plurality of initial parameters. In the arithmetic unit 11, the recurrence relation indicates that a $(k+1)^{th}$ term $a_{k+1}$ is equal to a product of a $k^{th}$ term $a_k$ multiplied by a sum of the common ratio and 1 (i.e., r+1) subtracted by a product of a $(k-1)^{th}$ term $a_{k-1}$ multiplied by the common ratio r. k is an integer larger than or equal to 1. Moreover, the roots of the characteristic equation of the recurrence relation are, respectively, 1 and the common ratio r. The recurrence relation can be expressed as:

$$a_{k+1}=(1+r)a_k-ra_{k-1}, \forall k \geq 1 \qquad (1)$$

In short, the arithmetic unit 11 can convert division into iteratively computing a recurrence relation so that the computed iteration result approaches the actual quotient Q. From the recurrence relation, the arithmetic unit 11 uses addition, subtraction, multiplication, and bit shifting to compute the quotient Q without using division. Accordingly, the cost and complexity of the hardware of the fast divider 1 can be reduced.

Persons with ordinary skill in the art may understand that the characteristic equation can be derived from the recurrence relation and each term of the recurrence relation can be expressed as the general solution of the equation. For example, the $k^{th}$ term $a_k$ of the sequence can be expressed as a linear combination of 1 and the common ratio r to the power of k ($r^k$) with a first coefficient $\alpha$ and a second coefficient $\beta$. The $k^{th}$ term $a_k$ can be expressed as:

$$a_k = \alpha + \beta r^k \quad (2)$$

The $k^{th}$ term $a_k$ approaches the actual quotient Q after repeated iteration computations. In other words, when k approaches infinity, the $k^{th}$ term $a_k$ can be expressed as:

$$\lim_{k \to \infty} a_k = \alpha + \lim_{k \to \infty} \beta r^k = \alpha \quad (3)$$

Accordingly, after multiple iteration computations, the first coefficient $\alpha$ equals or approaches the quotient Q. That is, the $k^{th}$ term $a_k$ approaches the actual quotient Q when $\alpha$ equals the quotient Q. The first coefficient $\alpha$ and the second coefficient $\beta$ correspond to the initial term $a_0$, the first term $a_1$ and the common ratio r of the recurrence relation. Therefore, the convergence speed of the fast divider 1 depends on how the initial parameter setting unit 10 decides the initial term $a_0$, the first term $a_1$ and the common ratio r. The iteration result computed by the arithmetic unit 11 approaches the quotient Q faster when the plurality of initial parameters is estimated more precisely. The faster the convergence speed, the more rapidly the iteration result obtained by the fast divider 1 after each iteration computation approaches quotient Q. How the initial parameter setting unit 10 determines the plurality of initial parameters will be further described herein.

Figure 2:
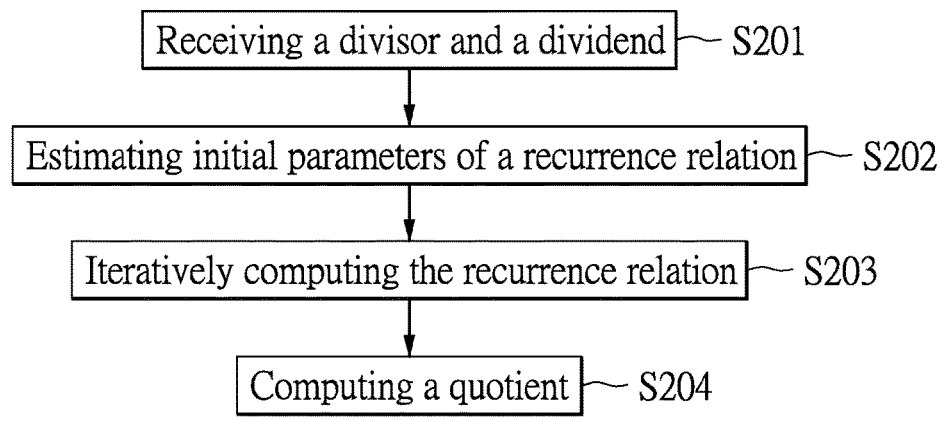
FIG. 2 is a flowchart of a fast division method according to one embodiment of the present disclosure.

To further describe the operation of the fast divider 1, please refer to FIG. 2, which is a flowchart of a fast division method according to one embodiment of the present disclosure. The fast division method in FIG. 2 is performed with the fast divider 1 in FIG. 1. In Step S201, the fast divider 1 receives a divisor D and a dividend N. For better understanding, in the present embodiment, the divisor D is assumed to be positive and the dividend N is 1. If the dividend N is not 1, the arithmetic unit 11 multiplies the computed quotient Q with the dividend N to obtain the actual quotient.

In Step S202, the initial parameter setting unit 10 sets the initial parameters of the recurrence relation. More particularly, the initial parameter setting unit 10 sets the initial term $a_0$ to be 0 and sets the first term $a_1$ to be a first function g(D) divided by 2 to the power of a second function f(D) (as expressed in Equation 4). Moreover, the initial parameter setting unit 10 further sets the common ratio r to be 1 subtracted by a product of the first term $a_1$ multiplied by the divisor D (as expressed in Equation 5). It should be noted that the first function g(D) and the second function f(D) exist when the common ratio has an absolute value |r| smaller than 1.

$$a_1 = \frac{g(D)}{2^{f(D)}} \quad (4)$$

-continued $$r = 1 - a_1 D = 1 - \frac{g(D)D}{2^{f(D)}} \quad (5)$$

Then, substituting k=0, 1, respectively, into Equation (2), we obtain the following two equations:

$$a_0 = \alpha + \beta \quad (6)$$

$$a_1 = \alpha + \beta r \quad (7)$$

Subtracting Equation (7) from Equation (6) multiplied by r, we obtain the following equation:

$$\alpha = \frac{a_1 - r a_0}{1 - r} \quad (8)$$

Substituting $a_0$, $a_1$ and r into Equation (8), the first coefficient $\alpha$ can be simplified as:

$$\alpha = \frac{\frac{g(D)}{2^{f(D)}} - r*0}{1 - \left(1 - \frac{g(D)D}{2^{f(D)}}\right)} = \frac{1}{D} = Q \quad (9)$$

As previously stated, in the present disclosure, the initial term $a_0$, the first term $a_1$ and the common ratio r enables the first coefficient $\alpha$ to approach the quotient Q.

It should be noted that since the common ratio $r=1-a_1 D$, the first term $a_1$ estimated by the initial parameter setting unit 10 approaches 1/D, the absolute value |r| of the common ratio approaches 0, and the convergence speed of the recurrence relation becomes faster. Therefore, the convergence speed of the recurrence relation depends on the first function g(D) and the second function f(D).

Figure 3:
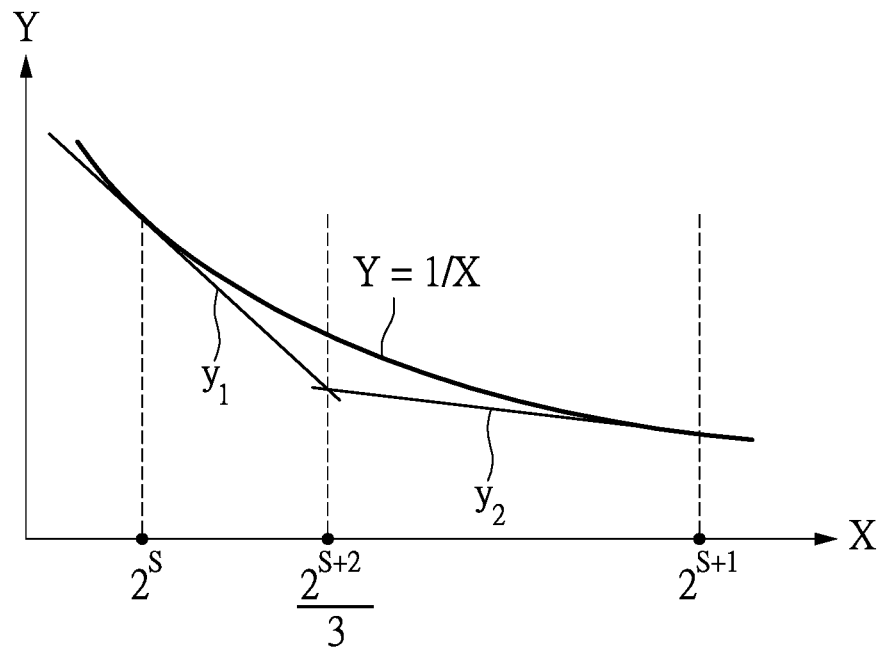
FIG. 3 is a graph showing the estimation of a first term of a recurrence relation according to one embodiment of the present disclosure.

To describe how the first function g(D) and the second function f(D) are designed to estimate the first term $a_1$, please refer to FIG. 3, which is a graph showing the estimation of a first term of a recurrence relation according to one embodiment of the present disclosure. FIG. 3 indicates an equation y=1/x. In the present disclosure, the equation y=1/x is approximated by the fast divider 1 using a linear equation to determine an x value approaching the divisor D and further obtain the quotient Q. It should be noted that, the equation y=1/x only exemplifies how the initial parameter setting unit 10 estimates the first term $a_1$, to which the present disclosure is not limited.

The divisor D is within a range between 2 to the power of s and 2 to the power of s+1 with s being an integer (i.e., $2^s \leq D < 2^{s+1}$). After receiving the divisor D, the initial parameter setting unit 10 obtains the s value by determining the power when $2^s$ approaches the divisor D the most but is smaller than D.

Then, the initial parameter setting unit 10 determines an intersection point of the equation $x=2^s$ and the equation y=1/x, and the intersection point is used as a tangential point to derive a linear equation (Equation (10)) of a first tangent line $y_1$.

$$y_1 = \frac{1}{2^s} + \frac{-1}{2^{2s}}(x - 2^s) \quad (10)$$

Similarly, the initial parameter setting unit 10 determines an intersection point of the equation $x=2^{s+1}$ and the equation y=1/x, and the intersection point is used as a tangential point to derive a linear equation (Equation (11)) of a second tangent line $y_2$.

$$y_2 = \frac{1}{2^{s+1}} + \frac{-1}{2^{2s+2}}(x - 2^{s+1}) \tag{11}$$

Furthermore, the initial parameter setting unit 10 computes an intersection point of the first tangent line $y_1$ and the second tangent line $y_2$ to obtain the x-coordinate of the intersection point as $2^{s+2}/3$.

The initial parameter setting unit 10 determines how to estimate the first term $a_1$ according to the value of the divisor. When the divisor D is located on the left side of the linear equation $x=2^{s+2}/3$, the first term $a_1$ converges faster to the actual quotient Q if the first term $a_1$ is estimated with the first tangent line $y_1$. On the contrary, when the divisor D is located on the right side of the linear equation $x=2^{s+2}/3$, the first term $a_1$ converges faster to the actual quotient Q if the first term $a_1$ is estimated with the second tangent line $y_2$.

To enable the first term $a_1$ to approach 1/D, the fast divider 1 of the present disclosure defines a first function g(D) and a second function f(D). The first function g(D) is equal to 2 to the power of s+1 subtracted by the divisor D and the second function f(D) is equal to a product of s multiplied by 2 when a product of the divisor D multiplied by 3 is smaller than or equal to 2 to the power of s+2. On the other hand, the first function g(D) is equal to 2 to the power of s+2 subtracted by the divisor D and the second function f(D) is equal to a product of s multiplied by 2 plus 2 when a product of the divisor D multiplied by 3 is larger than 2 to the power of s+2. The first function g(D) and the second function f(D) are expressed below.

$$g(D) = \begin{cases} 2^{s+1} - D, & \text{if } 3D \leq 2^{s+2} \\ 2^{s+2} - D, & \text{if } 3D > 2^{s+2} \end{cases} \tag{12}$$

In the present disclosure, the fast divider 1 changes the first function g(D) and the second function f(D) according to the value of the divisor $$f(D) = \begin{cases} 2s, & \text{if } 3D \leq 2^{s+2} \\ 2s + 2, & \text{if } 3D > 2^{s+2} \end{cases} \tag{13}$$

D to adjust the first term $a_1$ so that the first term $a_1$ approaches actual quotient Q. Compared to the conventional divider where the quotient Q is approached from $x=2^s$ or $2^{s+1}$, the fast divider 1 of the present disclosure estimates the quotient Q using the first term $a_1$ to exhibit a higher convergence speed.

For example, when the divisor D is 100, the fast divider 1 determines that s is 6, and 3*(100) is larger than $2^8$. Using the Equations (12) and (13), the first function g(D) is 156, and the second function f(D) is 14. Then, according to Equation (4), the fast divider 1 sets the first term $a_1$ to be $156/2^{14}$. Compared to the conventional divider where 1/100 is approached from 1/64 or 1/128, the fast divider 1 of the present disclosure iteratively computes the first term $a_1$ to enable the computed iteration result converges to 1/100 more rapidly.

Then, referring back to FIG. 2, in Step S203, the initial parameter setting unit 10 outputs the plurality of initial parameters. The arithmetic unit 11 iteratively computes the recurrence relation according to the plurality of initial parameters so that the iteration result after each iteration computing approaches to the actual quotient Q. In Step S204, the arithmetic unit 11 outputs the quotient Q to circuitry on the back end to complete the fast division method.

Figure 4:
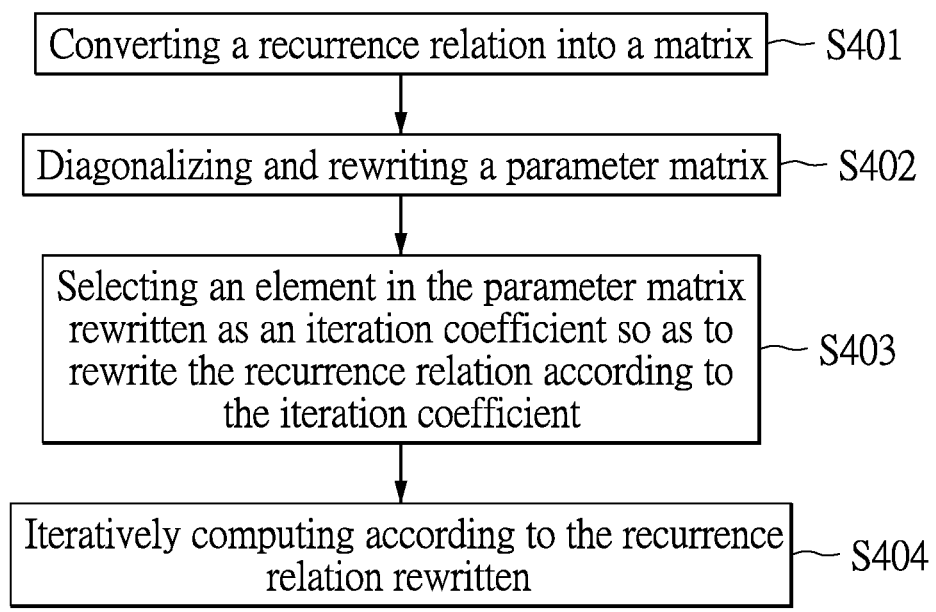
FIG. 4 is a flowchart of iteratively computing a recurrence relation according to one embodiment of the present disclosure.

To obtain the quotient Q rapidly, the present disclosure further provides a method for rapidly computing the recurrence relation. Referring to FIG. 4, FIG. 4 is a flowchart of iteratively computing a recurrence relation according to one embodiment of the present disclosure. The computing method in FIG. 4 is performed with the arithmetic unit 11 in FIG. 1. In Step S401, the arithmetic unit 11 converts the recurrence relation into a matrix format, expressed as:

$$\begin{bmatrix} a_{k+1} \\ a_k \end{bmatrix} = \begin{bmatrix} 1+r & -r \\ 1 & 0 \end{bmatrix} \begin{bmatrix} a_k \\ a_{k-1} \end{bmatrix} \tag{14}$$

$$= \begin{bmatrix} 1+r & -r \\ 1 & 0 \end{bmatrix}^2 \begin{bmatrix} a_{k-1} \\ a_{k-2} \end{bmatrix}$$

$$\vdots$$

$$= \begin{bmatrix} 1+r & -r \\ 1 & 0 \end{bmatrix}^k \begin{bmatrix} a_1 \\ a_0 \end{bmatrix}, \forall k \geq 1$$

According to Equation (14), during the iteration computations by the arithmetic unit 11, if $$\begin{bmatrix} 1+r & -r \\ 1 & 0 \end{bmatrix}^k$$

approaches $$\lim_{k \to \infty} \begin{bmatrix} 1+r & -r \\ 1 & 0 \end{bmatrix}^k$$

within a finite number of iteration computations, the iteration result computed by the arithmetic unit 11 is more approximate to the actual quotient Q.

Therefore, to make the iteration result computed by the arithmetic unit 11 rapidly approach the actual quotient Q, the arithmetic unit 11 defines a parameter matrix $M_t$. The parameter matrix $M_t$ has a plurality of elements therein depending on the common ratio r, and the parameter matrix $M_t$ changes with the change of the number of iteration computations. The parameter matrix $M_t$ is equal to the square of a previous parameter matrix $M_{t-1}$ obtained after a $(t-1)^{th}$ iteration computation is executed when a $t^{th}$ iteration computation is being executed. Thus, we obtain $$M_t = \begin{cases} \begin{bmatrix} 1+r & -r \\ 1 & 0 \end{bmatrix}, & \text{if } t = 0 \\ M_{t-1}^2, & \text{if } t > 0 \end{cases} \tag{15}$$

where t is the number of iteration computations by the arithmetic unit 11.

According to Equation (15), the parameter matrix $M_t$ can be rewritten as:

$$M_t = \begin{bmatrix} 1+r & -r \\ 1 & 0 \end{bmatrix}^{2^t} \quad (16)$$

The iteration result after the $t^{th}$ iteration computation by the arithmetic unit 11 can be expressed as a matrix product of the parameter matrix $M_t$ multiplied by a column matrix having the first term $a_1$ and the initial term $a_0$ as elements. Thus, we obtain $$\begin{bmatrix} a_{2^t+1} \\ a_{2^t} \end{bmatrix} = M_t \begin{bmatrix} a_1 \\ a_0 \end{bmatrix} \quad (17)$$

According to Equation (16), the power of the parameter matrix $M_t$ increases exponentially as the number of iteration computations increases. As a result, the parameter matrix $M_t$ rapidly approaches $$\lim_{k \to \infty} \begin{bmatrix} 1+r & -r \\ 1 & 0 \end{bmatrix}^k .$$

Compared to the iteration computation by the conventional divider, the iteration computation of the arithmetic unit 11 according to the present disclosure exhibits a higher convergence speed.

In Step S402, the arithmetic unit 11 diagonalizes and rewrites the parameter matrix $M_t$. More particularly, the diagonalized parameter matrix $M_t$ is expressed below:

$$M_t = \begin{bmatrix} 1+r & -r \\ 1 & 0 \end{bmatrix}^{2^t} = \begin{bmatrix} 1 & r \\ 1 & 1 \end{bmatrix} \begin{bmatrix} 1 & 0 \\ 0 & r \end{bmatrix}^{2^t} \begin{bmatrix} 1 & r \\ 1 & 1 \end{bmatrix}^{-1} \quad (18)$$

Then, the diagonalized parameter matrix $M_t$ is rewritten as:

$$M_t = \begin{bmatrix} \sum_{i=0}^{2^t} r^i & -\sum_{i=1}^{2^t} r^i \\ \sum_{i=0}^{2^t-1} r^i & -\sum_{i=1}^{2^t-1} r^i \end{bmatrix} \quad (19)$$

In Step S403, the arithmetic unit 11 selects an element in the rewritten parameter matrix $M_t$ as an iteration coefficient $m_t$ so as to rewrite the recurrence relation according to the iteration coefficient $m_t$. In the present embodiment, the arithmetic unit 11 selects $$\sum_{i=0}^{2^t-1} r^i$$

as an iteration coefficient $m_t$. On the other hand, $$-\sum_{i=1}^{2^t-1} r^i$$

can be expressed as $(1-m_t)$. Moreover, in other embodiments, the arithmetic unit 11 may also select other elements in the parameter matrix $M_t$ as iteration coefficients $m_t$, to which the present disclosure is not limited.

When $t>0$, the iteration coefficient $m_t$ can be expressed as $m_t=(1+r^{2^{t-1}})m_{t-1}$. Since $$m_{t-1} = \sum_{i=0}^{2^{t-1}-1} r^i = (1+r+\ldots+r^{2^{t-1}-1}) = \frac{1-r^{2^{t-1}}}{1-r},$$

the iteration coefficient $m_t$ can further be rewritten as:

$$m_t = [2-(1-r^{2^{t-1}})]m_{t-1} = [2-(1-r)m_{t-1}]m_{t-1} \quad (20)$$

According to Equation (20), the iteration coefficient $m_t$ is expressed as:

$$m_t = \begin{cases} 1, & \text{if } t = 0 \\ [2-(1-r)m_{t-1}]m_{t-1}, & \text{if } t > 0 \end{cases} \quad (21)$$

On the other hand, from Equation (17) and (19), the previously stated recurrence relation can further be simplified as:

$$a_{2^t} = m_t a_1 + (1-m_t) a_0 \quad (22)$$

In other words, the recurrence relation in Equation (1) can be simplified with only the initial term $a_0$, the first term $a_1$ and the common ratio $r$ for iteration computations.

In Step S404, the arithmetic unit 11 iteratively computes according to the recurrence relation in Equation (22) to obtain the iteration result $a_{2^t}$ after the $t^{th}$ iteration computation. Since the recurrence relation in Equation (22) exhibits a high convergence speed, the iteration result $a_{2^t}$ rapidly approaches the actual quotient Q.

As previously stated, the present disclosure provides a fast divider and a fast division method thereof using only addition, subtraction, multiplication, and bit shifting to compute the quotient in division computation to reduce the hardware cost, the hardware size and the hardware complexity. Moreover, the present disclosure providing a fast divider and a fast division method thereof exhibits a convergence speed and the fast divider only executes a small number of iteration computations to obtain an iteration result approximate to the actual quotient.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:
1. A fast divider, comprising:
   an initial parameter setting unit being configured to receive a divisor and a dividend and set a plurality of initial parameters of a sequence according to said divisor and said dividend, wherein said plurality of initial parameters comprise an initial term, a first term and a common ratio, and said common ratio has an absolute value smaller than 1; and an arithmetic unit being coupled to said initial parameter setting unit and configured to store a recurrence relation of said sequence and iteratively compute a quotient using said recurrence relation according to said plurality of initial parameters, wherein said recurrence relation indicates that a $(k+1)^{th}$ term is equal to a product of a $k^{th}$ term multiplied by a sum of said common ratio and 1 subtracted by a product of a $(k-1)^{th}$ term multiplied by said common ratio, and k is an integer larger than or equal to 1, wherein said initial term is equal to 0, said first term is equal to a first function divided by 2 to the power of a second function, and said common ratio is equal to 1 subtracted by a product of said first term multiplied by said divisor, wherein said first function and said second function exist as said common ratio having the absolute value smaller than 1.

2. The fast divider of claim 1, wherein said divisor is within a range between 2 to the power of s and 2 to the power of s+1 with s being an integer, said first function is equal to 2 to the power of s+1 subtracted by said divisor and said second function is equal to a product of s multiplied by 2 when a product of said divisor multiplied by 3 is smaller than or equal to 2 to the power of s+2, and said first function is equal to 2 to the power of s+2 subtracted by said divisor and said second function is equal to a product of s multiplied by 2 plus 2 when a product of said divisor multiplied by 3 is larger than 2 to the power of s+2.

3. The fast divider of claim 1, wherein said first term estimated by said initial parameter setting unit corresponds to a convergence speed of said sequence, and said common ratio approaches 0 and said convergence speed of said sequence becomes faster when said first term approaches a reciprocal of said divisor.

4. The fast divider of claim 1, wherein said arithmetic unit converts said recurrence relation into a matrix product of a parameter matrix multiplied by a column matrix having said first term and said initial term as elements, wherein a plurality of elements in said parameter matrix depend on said common ratio, and said parameter matrix changes as the number of iteration computations increases, wherein said parameter matrix is equal to the square of a previous parameter matrix obtained after a $(t-1)^{th}$ iteration computation is executed when a $t^{th}$ iteration computation is being executed, so that the power of said parameter matrix increases exponentially as the number of said iteration computations increases, and wherein t is an integer larger than 1.

5. The fast divider of claim 4, wherein said arithmetic unit diagonalizes and rewrites said parameter matrix and selects an element in said parameter matrix rewritten as an iteration coefficient so as to rewrite said recurrence relation according to said iteration coefficient, wherein said recurrence relation rewritten indicates that an iteration result after said $t^{th}$ iteration computation is equal to a sum of a product of said first term multiplied by said iteration coefficient and a product of said initial term multiplied by a difference of 1 and said iteration coefficient and said arithmetic unit iteratively computes according to said recurrence relation rewritten so that said iteration result approaches said quotient as the number of said iteration computations increases.

6. A fast division method, comprising:
Step A: receiving, by an initial parameter setting unit, a divisor and a dividend;

Step B: estimating, by an initial parameter setting unit, a plurality of initial parameters of a sequence according to said divisor and said dividend, wherein said plurality of initial parameters comprise an initial term, a first term and a common ratio and said common ratio has an absolute value smaller than 1; and Step C: iteratively computing, by an arithmetic unit, a quotient using a recurrence relation of said sequence according to said plurality of initial parameters, wherein said recurrence relation indicates that a $(k+1)^{th}$ term is equal to a product of a $k^{th}$ term multiplied by a sum of said common ratio and 1 subtracted by a product of a $(k-1)^{th}$ term multiplied by said common ratio, and k is an integer larger than or equal to 1;

wherein said initial term is equal to 0, said first term is equal to a first function divided by 2 to the power of a second function, and said common ratio is equal to 1 subtracted by a product of said first term multiplied by said divisor, wherein said first function and said second function exist as said common ratio having the absolute value smaller than 1.

7. The fast division method of claim 6, wherein said divisor is within a range between 2 to the power of s and 2 to the power of s+1 with s being an integer, said first function is equal to 2 to the power of s+1 subtracted by said divisor and said second function is equal to a product of s multiplied by 2 when a product of said divisor multiplied by 3 is smaller than or equal to 2 to the power of s+2, and said first function is equal to 2 to the power of s+2 subtracted by said divisor and said second function is equal to a product of s multiplied by 2, plus 2, when a product of said divisor multiplied by 3 is larger than 2 to the power of s+2.

8. The fast division method of claim 6, wherein said first term corresponds to a convergence speed of said sequence, and said common ratio approaches 0 and said convergence speed of said sequence becomes faster when said first term approaches a reciprocal of said divisor.

9. The fast division method of claim 6, wherein Step C further comprises a step of:
Step C-1: converting said recurrence relation into a matrix product of a parameter matrix multiplied by a column matrix having said first term and said initial term as elements, wherein a plurality of elements in said parameter matrix depend on said common ratio, and said parameter matrix changes as the number of iteration computations increases, wherein said parameter matrix is equal to the square of a previous parameter matrix obtained after a $(t-1)^{th}$ iteration computation is executed when a $t^{th}$ iteration computation is being executed, so that the power of said parameter matrix increases exponentially as the number of said iteration computations increases, and wherein t is an integer larger than 1.

10. The fast division method of claim 9, wherein Step C further comprises steps of:
Step C-2: diagonalizing and rewriting said parameter matrix;
Step C-3: selecting an element in said parameter matrix rewritten as an iteration coefficient so as to rewrite said recurrence relation according to said iteration coefficient, wherein said recurrence relation rewritten indicates that an iteration result after said $t^{th}$ iteration computation is equal to a sum of a product of said first term multiplied by said iteration coefficient and a product of said initial term multiplied by a difference of 1 and said iteration coefficient; and Step C-4: iteratively computing according to said recurrence relation rewritten so that said iteration result approaches said quotient as the number of said iteration computations increases.

* * * * *